Patented Aug. 26, 1924.

1,506,501

UNITED STATES PATENT OFFICE.

LEO FREDERICK RETTGER AND HARRY ASHER CHEPLIN, OF NEW HAVEN, CONNECTICUT.

BEVERAGE.

No Drawing.   Application filed December 17, 1921.   Serial No. 523,021.

*To all whom it may concern:*

Be it known that we, LEO F. RETTGER and HARRY A. CHEPLIN, both citizens of the United States, residing at New Haven, county of New Haven, State of Connecticut, have invented certain new and useful Improvements in Beverages; and we do hereby declare the following to be a full, clear, and exact description of the invention, such as will enable others skilled in the art to which it appertains to make and use the same.

The present invention relates to improvements in sour milk products and methods of producing them. It also includes improved cultures for use in making such sour milk products.

Much time and effort have been given in recent years to the production of sour milk and sour milk products, and milk soured with *Bacillus bulgaricus* powders or tablets and special preparations have gained wide usage. These preparations are of undoubted merit. They are a valuable food and serve as a substitute for ordinary milk for which many persons have little or no tolerance and which to many others is objectionable as such. Furthermore, these sour milk products, when they have been prepared successfully, are beverages which have attained considerable popularity.

The improved sour milk product of the present invention bears some resemblances to sour milk prepared with pure cultures of *Bacillus bulgaricus* or with *bulgaricus* powders or tablets; but the new sour milk product is distinguished from such *bulgaricus* sour milk products in important respects. The new sour milk product never attains a degree of acidity in old culture which is attained by the *bulgaricus* milk. There is little or no danger of the new milk product becoming too sour if the time of incubation is within reasonable range, which cannot be said of the *bulgaricus* product. The new milk product acquires a creamy but never a sticky or stringing, consistency, while the *bulgaricus* milk has a thicker and at times a more or less slimy character. The new milk product has a decidedly perceptible aroma and taste which add very materially to its palatability and which are more or less absent from the *bulgaricus* milk.

The new sour milk product of the present invention is a specially prepared product, prepared with *Bacillus acidophilus*. In making the new milk product, strains of *Bacillus acidophilus* are used which, by a long process of development and of acclimatization have acquired the power of developing rapidly in milk, and bringing about coagulation of the casein within a relatively short period of time, e. g., 24 hours.

*Bacillus acidophilus* is one of the two bacilli forming the chief inhabitants of the intestines of infants that subsist entirely on mother's milk. As the diet of the infant is changed and made more complex, the predominating intestinal flora of the breast-fed child changes until finally, when the usual diet of the milk-weaned child is fed, the intestinal population assumes more and more the character of that of the ordinary adult, and the *Bacillus acidophilus* gradually disappears until its presence can be demonstrated only occasionally and in small numbers. The different types of bacilli which take its place include some which are decidedly fermentative and putrefactive and which, at times, according to many authorities, assume a rôle that is harmful to the host. *Bacillus acidophilus*, in so far as can be determined, is harmless, is neither putrefactive nor fermentative, and does not produce disagreeable odors and taste when grown in ordinary media in pure culture.

*Bacillus acidophilus* is similar in appearance to *Bacillus bulgaricus*. There are, however, certain important distinctions. *Bacillus acidophilus* produces relatively little acid in milk, seldom attaining more than 1%, even after continued incubation; whereas *Bacillus bulgaricus* at times produces as much as 3%. Furthermore, *Bacillus acidophilus* attacks maltose with acid formation, while *Bacillus bulgaricus* has no action on this sugar. A difference which is particularly important, from the practical standpoint, is the inability of the *bulgaricus* organism to live and multiply in the intestine of man and animals, whereas *Bacillus acidophilus* can and does undergo rapid development in the intestine of man, when administered, for example, by mouth in relatively large numbers, together with suitable nutriment. It has been claimed that the feeding of cultures of *Bacillus bulgaricus* in the form of sour milk or in tablets or powders brings about a change in the intestinal population in which the *bulgarican bacillus* supplants the useless and harmful intestinal bacteria, but this view is no longer tenable.

The implantation and proliferation of the *Bacillus acidophilus* in the intestine can be brought about by administering whey-broth cultures of the organism daily; and the amount of whey-broth culture required can be greatly reduced if along with the culture there is given daily a suitable amount of lactose or dextrin.

The present invention provides an improved form of the *Bacillus acidophilus* in the form of *acidophilus* milk culture which we will, for convenience, hereinafter refer to as "*acidophilus* milk."

The *Bacillus acidophilus*, in the form in which it is isolated, for example from the dejecta of persons in whom it has been established by lactose feeding, is unsuitable for the preparation of a satisfactory sour milk product; but we have found that the organism so isolated can be developed, by growing it for many generations and for long periods of time, until it becomes acclimated or accustomed to milk as its medium, to such an extent that the improved culture thus produced can be successfully used in the preparation of a satisfactory milk product. The preparation of the improved strains of the *bacillus* may thus be brought about, after complete isolation and identification of the organism in pure culture, by cultivation in milk until they become adapted to milk as a culture medium; and it is important that the *bacillus* should be isolated in the form of pure strains and trained so that they will develop and bring about coagulation of casein rapidly in milk. The training and acclimating should be carried to such an extent that, after the usual transfer to sterile milk, the latter becomes sufficiently acidified to undergo coagulation of the casein, for example, within 24 hours. In producing the improved strains, the recently isolated strains, which are slow and ineffective in milk, may thus be grown in milk for suitable periods of time, for example of two or three weeks or more, and with transplanting from milk to milk at frequent intervals, preferably every day, until the proper degree of coagulative activity is acquired.

The preparation of the improved sour milk product, after the improved strains of the *bacillus* have been produced, will be illustrated by the following specific example:

Fresh skimmed cow's milk is sterilized in one heating in an autoclave at 115° C., the time required for complete sterilizing varying with the volume of the milk and the nature of the container. Quart lots in ordinary glass flasks can be sterilized in about 22 to 24 minutes. Properly heated and sterilized milk should have a dark, creamy color but should not be distinctly brown. The milk is cooled to at least 40° C. or somewhat lower, and is then inoculated with the pure strains of *Bacillus acidophilus*, preferably using mixed strains, which have been grown in the manner above described so that they will develop rapidly in milk and bring about coagulation of the casein within about 24 hours at an incubation temperature of around 30 to 34° C. The inoculum should be a viable milk culture of the organism, and at least 5 to 10 cubic centimeters of the inoculum should ordinarily be used for each liter of milk treated. After thorough mixing of the newly inoculated milk it is incubated for the period above mentioned.

At the completion of the incubation period, the casein appears as a soft curd, with a thin layer of clear or almost clear whey over the surface. On shaking, the casein falls to pieces and the milk takes on a smooth consistency which resembles that of thick cream. At this stage, the milk is, in effect, practically indistinguishable in color and consistency from a high test cream.

The acidity of the *acidophilus* milk is never high, and seldom reaches more than 1%, even after long standing, for example, for three weeks time, at ordinary room temperature. The flavor resembles to some degree that of high-grade buttermilk and is not in the least disagreeable. The taste is mildly acid and pleasing to those who do not dislike ordinary buttermilk. The presence of contaminating bacteria is usually easily observed by the presence of foreign odors and tastes. Ordinary milk souring bacteria impart characteristic sour milk properties to the product, whereas the usual proteolitic bacteria of the putrefactive type produce odors which are at once detected as characteristic of this type.

It is accordingly important, in producing a satisfactory sour milk product, that pure strains of *Bacillus acidophilus* be used, which have become acclimated to milk and which develop rapidly therein, and that the preparation of the sour milk product with such improved strains should be carried out under conditions which prevent objectionable contamination of the product. The milk use, therefore, should be sterilized and protected from subsequent bacterial contamination, both immediately preceding and during the process of incubation, if a pure and uniform product is to be obtained. Following the incubation, the acidity is such as to offer some, though not complete, protection against the deleterious action of foreign bacteria.

In order to insure that the improved strains of the *bacillus* are maintained pure and of the desired strength in transforming power, it is desirable to cultivate several strains of the organism isolated at different times, so that, if one strain becomes contaminated or weak in transforming power, the other strains will be available. Mixed strains can advantageously be used in making the *acidophilus* milk. The reserved strains which are kept available should be transferred to new media at regular intervals. In developing and cultivating the improved strains of the *bacillus*, precaution should be taken to prevent introduction of foreign bacteria. It is accordingly important, both that the strains of the *bacillus* should be kept pure and in a strong and active condition, and that the milk used in making the new sour milk product should likewise be protected from objectionable contamination. The purity and viability of the product is particularly important where the *acidophilus* milk is to be used for therapeutic purposes.

The new sour milk product of the present invention has been found particularly valuable for use in bringing about an implantation and proliferation of the *Bacillus acidophilus* in the human intestine. The milk cultures of the new product possess a very marked and almost immediate transforming power on the intestinal bacteria when the *acidophilus* milk is administered. Abundant proliferation of *Bacillus acidophilus* has been obtained after taking the *acidophilus* milk daily from 4 to 6 days, and its complete predomination over other intestinal organisms has been maintained over prolonged periods of time, so long as the *acidophilus* milk consumption was continued. The new milk product has also been found of value in the treatment of different kinds of disturbances and ailments having their apparent origin in impairment of the digestive tract.

The new milk product may be used as a beverage or as a food and is both palatable and wholesome. It may be used alone or it may be compounded with other ingredients in making beverages, etc. Beverages may thus be prepared which contain *acidophilus* milk as the chief ingredient, or as one of the chief ingredients. Beverages can be prepared, for example, by the addition of flavored syrups to the *acidophilus* milk with or without the addition of vichy. Such drinks, when properly prepared, are pleasing to the taste and compare favorably in this respect with many of the wellknown popular beverages. Furthermore, unless the acidity of the flavors used is too great, and the flavors are employed in large amounts, the therapeutic property of the *acidophilus* milk does not appear to be in any way impaired. Other products may similarly be produced, for example, yeast-vitamine *acidophilus* milk.

The *acidophilus* milk may be reinforced with lactose, for example, by adding the sugar at the time the milk is taken. The lactose and *acidophilus* milk may be well shaken and the mixture allowed to stand, for example, for 30 minutes or more in a cool place, to promote the dissolving of the sugar. The addition of the lactose adds greatly to the richness of the milk.

It will thus be seen that the present invention provides an improved sour milk product of special value, not only as a food and beverage, but also for therapeutic purposes. It will further be seen that the invention includes also new and improved strains of the *Bacillus acidophilus* which have the important property of developing rapidly in milk and bringing about coagulation of casein therein within a relatively short time, e. g., within 24 hours. The invention further includes improvements in the production of the improved strains of the *bacillus* and in the production of the new milk product therewith. The invention also includes the new milk product itself, as well as beverages and other products in which the *acidophilus* milk enters as an ingredient.

We claim:

1. A sour milk product containing *Bacillus acidophilus*.

2. As a new product, *acidophilus* milk, of cream like consistency.

3. The method of producing a sour milk product which comprises inoculating milk with strains of *Bacillus acidophilus* which develop rapidly therein, and permitting such strains to develop until coagulation of casein takes place.

4. The method of producing a sour milk product which comprises inoculating milk with strains of *Bacillus acidophilus* which develop rapidly in milk, incubating the milk until coagulation of casein takes place and agitating the product to give it a cream like consistency.

In testimony whereof we affix our signatures.

LEO FREDERICK RETTGER.
HARRY ASHER CHEPLIN.